J. W. FITZ GERALD.
STORAGE BATTERY TESTING INSTRUMENT.
APPLICATION FILED MAR 26, 1920
1,397,247. Patented Nov. 15, 1921.
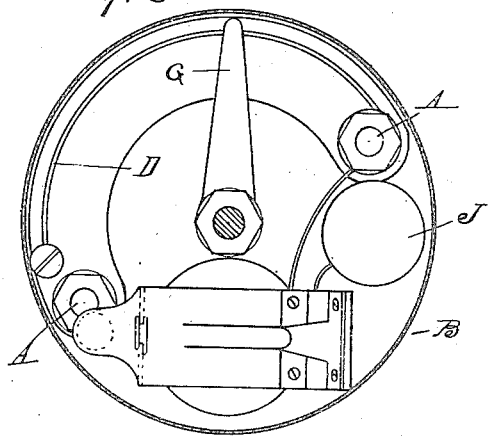
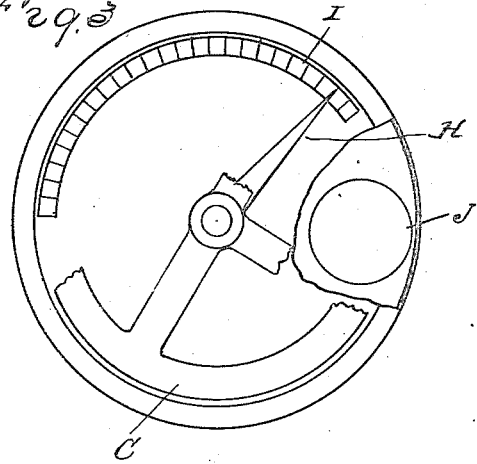
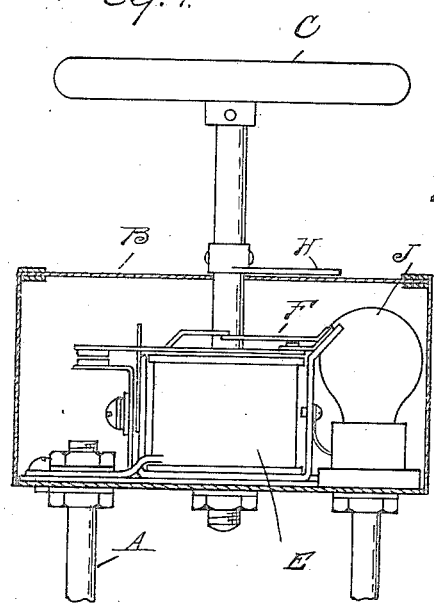
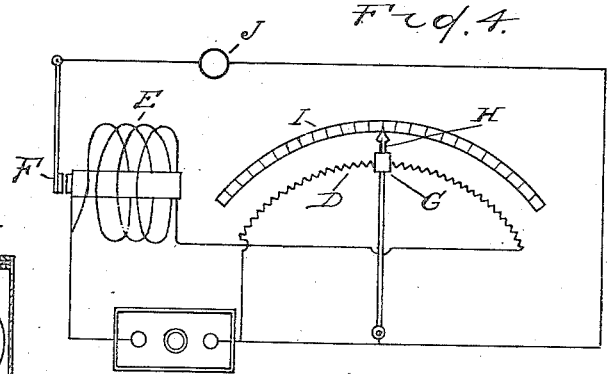
Inventor
John W. Fitzgerald
By Whittemore Hulbert & Whittemore
Attorneys

UNITED STATES PATENT OFFICE.

JOHN W. FITZGERALD, OF DETROIT, MICHIGAN.

STORAGE-BATTERY-TESTING INSTRUMENT.

1,397,247.  Specification of Letters Patent.  Patented Nov. 15, 1921.

Application filed March 26, 1920. Serial No. 368,998.

*To all whom it may concern:*

Be it known that I, JOHN W. FITZGERALD, a citizen of the United States of America, residing at Detroit, in the county of Wayne and State of Michigan, have invented certain new and useful Improvements in Storage-Battery-Testing Instruments, of which the following is a specification, reference being had therein to the accompanying drawings.

In the present state of the art it is usual to test storage batteries by the specific gravity of the electrolyte. This requires the use of a hydrometer and the withdrawal of a sufficient quantity of the electrolyte from the battery jar to float the same. It frequently happens that the battery to be tested is low in electrolyte so that the requisite quantity cannot be withdrawn and where water is first added, the reading will not be correct unless time is first given for proper diffusion.

When the current is drawn from a storage battery, the fall in voltage is proportional to the stored charge, but the variation is so slight that an ordinary volt meter would scarcely indicate the same. The construction of a sufficiently sensitive instrument would be costly and would involve difficulties in the use of the same so that the hydrometer test is preferable. To secure a simple and sensitive indicator, I have devised a construction in which a standard current volume is drawn from the battery, regardless of the charge therein, by suitably adjusting the resistance in the circuit and the amount of adjustment in the resistance is measured to indicate the stored charge in the battery. Preferably, the adjustment for changing the resistance is indicated on a scale calibrated either in units of charge of any specific gravity of the electrolyte, or any other indication which would show the condition of the battery.

Various specific constructions may be used to embody the principle of my invention, but as shown,—

Figure 1 is a longitudinal section through one form of instrument;

Fig. 2 is a horizontal section therethrough;

Fig. 3 is a plan view;

Fig. 4 is a diagram illustrating the electrical connections.

A are pointed prods or electrodes for establishing connection with the storage battery by pressing the same into the soft metal terminals thereof. B is a casing on which said prods are mounted, and C is a handle projecting upward from the casing and forming a means for pressing the prods into engagement with the terminals. As indicated in the diagram of Fig. 4, the prods A are connected into an electrical circuit, including a rheostat D and an electromagnet E, the latter being arranged to operate a circuit closer F, which is so adjusted that it will be actuated only when a predetermined current volume flows through the circuit. The rheostat D is provided with an adjustable contact G by which the resistance can be cut in or cut out, and H is an index hand connected with the contact G and operating in connection with a scale I. Preferably, the adjustable contact G is operated by the same handle C, which is used for pressing the prods into engagement with the terminals, said handle being revolubly mounted in the casing B and connected to both the contact G and the index H. The circuit closer F is connected into an independent electrical circuit in multiple with the circuit through the rheostat and magnet, and this independent circuit preferably contains a lamp bulb J or other indicator.

With the construction as described, to test the battery the prods A are pressed into the terminals by the handle C and the latter is then turned slowly in a direction to cut out resistance in the rheostat and when the resistance is sufficiently lowered, so that the current flowing through the magnet E is of a predetermined volume, the circuit closer F will be operated, which illuminating the lamp J will at once attract the attention of the operator. The reading is then taken of the position of the index H upon the scale I and this will indicate the condition of charge in the battery. Preferably, the lamp J is so arranged that it will illuminate the scale, so that it is possible to test the battery in the dark.

In the construction of the instrument, I preferably use a high resistance conductor for forming both the convolutions of the magnet E and the rheostat D. As shown, the rheostat is formed by a circular segment of the conductor with which the contact G is engaged and the scale I is upon a segment of the same angular magnitude. The electromagnet E and circuit closer F may be of standard construction, such as used many places in the art and the whole instrument is therefore one simple in construction and inexpensive to manufacture.

What I claim as my invention is:

1. A storage battery tester, comprising means for closing an electrical circuit between the terminals of the battery, an adjustable member for varying the resistance of said circuit, and means coöperating with said adjustable member for indicating the battery charge by the position of the adjustable member.

2. A storage battery tester, comprising means for closing an electrical circuit between the terminals of the battery, an adjustable member for varying the resistance of said circuit, means in said circuit for indicating the flow therethrough of a predetermined current volume, and means coöperating with said adjustable member for indicating by the position thereof when said predetermined current volume is attained the amount of charge in the battery.

3. A storage battery tester, comprising means for closing an electrical circuit between the battery terminals, a rheostat included in said circuit, a movable contact member for varying the resistance of said rheostat, an electromagnet in said circuit, indicator means actuated by said magnet upon the flow through said circuit of a predetermined current volume, and means coöperating with said movable contact for indicating by the position thereof the charge in the battery.

4. A storage battery tester, comprising a pair of prods for effecting electrical connection with the terminals of the battery, a handle for pressing said prods into the terminals, an electric circuit between said prods including a rheostat and a current volume indicator, an adjustable contact with said rheostat, and means coöperating with said adjustable contact for indicating by the position thereof the charge in the battery.

5. A storage battery tester, comprising a pair of prods, a frame on which said prods are mounted, a handle rotatively engaging said frame and forming a means for pressing the prods into contact with the battery terminals, an electric circuit between said prods, a rheostat and an indicator for a predetermined current volume included in said circuit, an adjustable contact for said rheostat mounted upon said handle and adjusted by the rotation thereof, an index on said handle, and coöperating indicating means for determining by the position of said index the charge in the battery.

In testimony whereof I affix my signature.

JOHN W. FITZGERALD.